Feb. 18, 1958  J. D. STEINBACH  2,823,665
HEATING PAD
Filed Sept. 12, 1955

INVENTOR.
JOHN D. STEINBACH
BY
Buckhorn and Cheatham
ATTORNEYS

United States Patent Office 2,823,665
Patented Feb. 18, 1958

2,823,665

HEATING PAD

John D. Steinbach, Tillamook, Oreg.

Application September 12, 1955, Serial No. 533,639

1 Claim. (Cl. 126—263)

This invention relates to chemical heating pads, and particularly to chemical heating pads of the type filled with a material which will exothermically react with water so as to supply heat when moistened. Such material will be hereafter referred as exothermic material.

It has not been possible with prior heating pads readily to uniformly moisten the exothermic material in the pad, and thus the pad has not been capable of supplying uniform quantities of heat from all portions thereof. This is obviously objectionable in that, if a person desires to warm his hands, certain portions of his hands will remain cold while other portions will be heated. One reason why prior pads have had this disadvantageous operating condition is that in most pads the exothermic material is permitted to shift around and thus become ununiformly distributed. Thus, although the pad may have a plurality of perforations therein, the thin layers of the exothermic material will be completely moistened while the thicker layers will not. In other bags the material is prevented from shifting, but the water has not been permitted uniform access to the exothermic material.

It is a main object of the present invention to provide a chemical heating pad overcoming the above-mentioned disadvantages, and particularly to provide one in which the exothermic material will be uniformly subjected to the action of water when the pad is dipped into a body of water.

A further object of the present invention is to provide a pad of the above type which is simple and inexpensive in construction.

A further object of the present invention is to provide such a pad which is ideally suited for being wrapped or placed around a handle of an instrument, such as a fishing pole or rifle.

The pad of the present invention is characterized by including a flat bag which is divided into a number of separate sections or compartments, each of which contains a quantity of exothermic material. The bag is so perforated that equal quantities of water are admitted to each section when the bag is dipped into water.

Various other objects of the present invention will be apparent from the following description taken in connection with the accompanying drawings, wherein.

Figure 1:
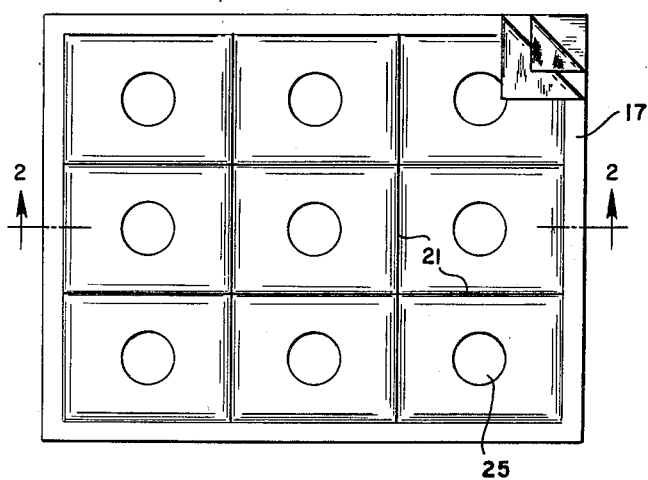
Fig. 1 is a plan view of a chemical heating pad embodying the concepts of the present invention.

Referring to the accompanying drawings, the heating pad disclosed in Figs. 1 through 4 comprises a flat, waterproof bag of rectangular configuration. The bag comprises three equal size, superimposed sheets 11, 13 and 15 joined at their edges at 17 such as by stitching or heat sealing or similar means. The outer sheets 11 and 15 are formed of waterproof material, such as plastic sheet, and the inner sheet 13 is formed of a foraminous material which is permeable to water but substantially impermeable to granular exothermic material. The sheet 13 may, for instance, be formed of a fine mesh fabric.

The bag is divided into a number of equal sections by having the sheets 11, 13 and 15 secured or joined together along crossing lines 21 which are parallel to certain edges of the bag but extend to the other edges. Within each section or compartment of the bag is an equal quantity of exothermic material 23 arranged between the foraminous sheet 13 and the waterproof sheet 15.

The waterproof sheet 11 is formed with a plurality of perforations; in the particular embodiment shown, there being one perforation or hole 25 for each section or compartment. The perforations are of equal size and are similarly located with reference to the respective sections or pockets. Thus, when the bag is dipped into water, an equal quantity of water is admitted to each section and thus the exothermic material of the bag is uniformly subjected to the action of water so that the bag is uniformly heated.

Figure 3:
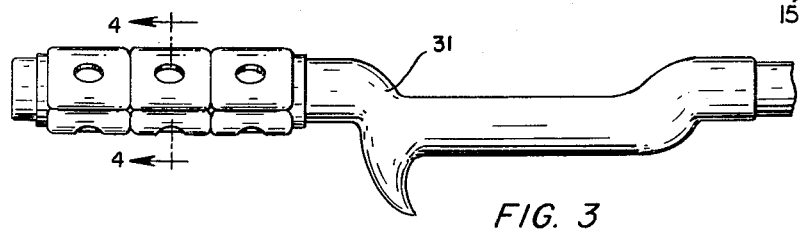
Fig. 3 is a view showing the pad applied to a fishing pole handle.

The particular bag shown is divided into six sections, the bag being approximately 4 inches by 6 inches. It has been found that a bag of this size is ideally suited for use on the handle of a fishing pole or rod. The bag may be made in larger or smaller sizes. The pad or bag is shown in Fig. 3 as being wrapped around the handle of a pole 31.

Figures 4, 5:
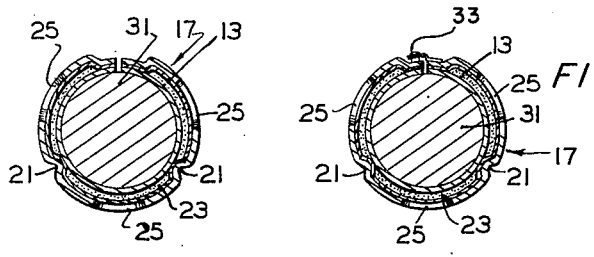
Fig. 4 is a sectional view taken along line 4—4 of Fig. 3.
Fig. 5 is a view similar to Fig. 4, showing a modified form of the invention.

Fig. 5 shows the pad as being equipped with snap fasteners 33 at adjacent edges thereof to enable the pad readily to be retained on a pole handle.

Figure 6:
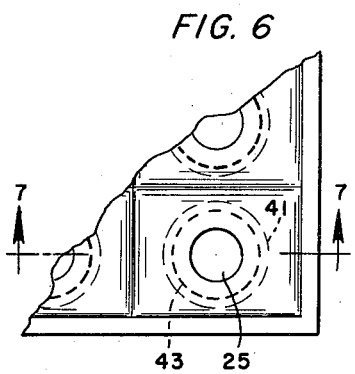
Fig. 6 is a fragmentary plan view showing another modified form of the invention.
Figure 2:
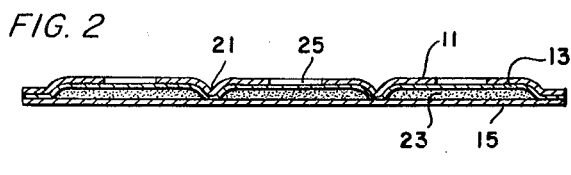
Fig. 2 is a sectional view taken along line 2—2 of Fig. 1.
Figure 7:
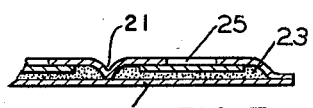
Fig. 7 is a sectional view taken along line 7—7 of Fig. 6.

Figs. 6 and 7 show a modified form of the invention in which, instead of a foraminous sheet 13 being provided for the pad, each section or compartment of the pad is provided with its own patch 41 of foraminous material disposed within the section and covering the hole or perforation 25 therein. The patch is shown as being circular in form and being secured to the waterproof sheet 11 by stitching, heat sealing, or other similar means 43. This form of the invention readily facilitates joining of the two waterproof sheets 11 and 15 to each other at the lines 21 and at the edges since there is no foraminous material interposed between the waterproof sheets at such places. Also, this form of the invention uses less foraminous material than the first form of the invention.

Figure 8:
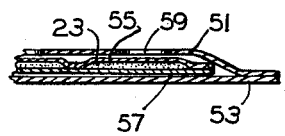
Fig. 8 is a sectional view similar to Fig. 7 but showing a modified construction.

Fig. 8 shows a further modified form of the invention in which the pad comprises a waterproof bag made up of two plastic sheets 51 and 53, preferably of rectangular form joined together at their edges. Prior to joining one pair of edges, a fabric bag made up of sheets 55 and 57 is slipped within the waterproof bag. The fabric bag just fits within the plastic bag and is divided into sections each containing an equal quantity of exothermic material 23. There are perforations or holes 59 in the plastic sheet, one for each section of the fabric bag. The holes 59 are of equal size and centrally located relative to the sections.

The exact composition of the exothermic material does not form a part of the present invention, and any known or suitable material may be employed.

Having described the invention in what is considered to be the preferred embodiment thereof, it is desired that it be understood that the invention is not to be limited other than by the provisions of the following claim.

I claim:

A heating pad comprising three sheets of similar sizes and shapes arranged in superimposed relation, the marginal edges of said sheets being permanently joined together to form a bag, the two outer sheets being of waterproof material and the inner sheet being water permeable, said outer sheets being connected with the inner sheet interposed therebetween and anchored thereby, means interconnecting the sheets to subdivide the pad into a grid of individual pockets with the inner sheet anchored to the outer sheets at each line of the grid, a quantity of exothermic material in each pocket to be confined therein between the inner sheet and one of the outer sheets and the inner sheet being impermeable to the exothermic material and being interposed between the material and the other outer sheet throughout the extent of each pocket, and a plurality of spaced perforations formed in said other outer sheet and at least one such perforation communicating with each pocket for admitting water into the pocket through the inner sheet.

References Cited in the file of this patent

UNITED STATES PATENTS

| | | |
|---|---|---|
| 2,533,958 | Root et al. | Dec. 12, 1950 |
| 2,710,008 | Jensen | June 7, 1955 |

FOREIGN PATENTS

| | | |
|---|---|---|
| 736,030 | France | Apr. 27, 1932 |